United States Patent [19]

Bleacher et al.

[11] Patent Number: 4,515,867

[45] Date of Patent: May 7, 1985

[54] METHOD FOR ABLATING A CODED MARKING INTO A GLASS WORKPIECE AND PRODUCT THEREOF

[75] Inventors: John N. Bleacher, Lititz; Barry M. Cushman, Lancaster, both of Pa.

[73] Assignee: RCA Corporation, Princeton, N.J.

[21] Appl. No.: 420,495

[22] Filed: Sep. 20, 1982

[51] Int. Cl.³ .................. B32B 3/10; B32B 5/16; B32B 7/00; B32B 19/04
[52] U.S. Cl. .................. 428/204; 427/53.1; 427/64; 427/165; 427/270; 427/271; 428/172; 428/206; 428/208; 428/210; 428/212; 428/324; 428/428; 428/446; 428/454
[58] Field of Search ........ 428/324, 172, 204, 206–208, 428/210, 212, 454, 446, 428; 427/64, 53.1, 165, 270, 271

[56] References Cited

U.S. PATENT DOCUMENTS 4,150,191  4/1979  Karki ................................ 428/454
4,323,755  4/1982  Nierenberg ...................... 219/121
4,327,283  4/1982  Heyman et al. ................. 235/487

Primary Examiner—Marion E. McCamish
Assistant Examiner—P. R. Schwartz
Attorney, Agent, or Firm—Eugene M. Whitacre; Dennis H. Irlbeck; LeRoy Greenspan

[57] ABSTRACT

A dark-colored undercoating is deposited on a desired surface area of a glass workpiece, and a light-colored overcoating is applied upon the undercoating, each coating being dried in less than about 60 seconds. Then a plurality of related marks is recessed through the overcoating by ablation, as with a laser beam. Each of the undercoating and the overcoating is comprised of pigment particles and an alkali silicate binder. Unlike the prior practice, the undercoating contains an operative proportion of mica particles, and the overcoating is essentially free from mica.

10 Claims, 4 Drawing Figures

METHOD FOR ABLATING A CODED MARKING INTO A GLASS WORKPIECE AND PRODUCT THEREOF

BACKGROUND OF THE INVENTION

This invention relates to a novel method for ablating a coded marking into a glass workpiece and particularly, although not exclusively, to a method for ablating a machine-readable coded marking into a coating on a glass-envelope part of a CRT (cathode-ray tube) using a laser beam.

U.S. Pat. No. 4,327,283 issued Apr. 27, 1982 to P. M. Heyman et al. describes a glass workpiece that carries a machine-readable coded marking, such as a bar-code marking, in its external surface. In one form, the glass workpiece comprises a main body, a thin, dark-colored undercoating on a portion of the external surface of the body, and a thin, light-colored overcoating on the undercoating. The marking comprises a related sequence of substantially-parellel bars recessed into and through the overcoating. The marking may be made by depositing the coatings, each of which consists essentially of pigment particles and an alkali silicate binder, on a selected area of the workpiece and then recessing the marking into and through the overcoating. Recessing can be achieved by ablating the overcoating with a laser beam.

The coatings disclosed in the Heyman et al. patent, which contain a single-component alkali-silicate binder, are improved upon with coatings containing mixtures of three alkali silicates, as disclosed in the patent application entitled, "Method of Making a Coded Marking in a Glass Workpiece Employing a Trisilicate Coating and Product Thereof," filed concurrently herewith by S. B. Deal et al. Such improved coatings can be produced very rapidly (e.g., in less than 60 seconds) on an automatic machine which will also ablate the marking into the workpiece. Still further improvements are desirable while retaining the improvements realized by the novel method disclosed in the Deal et al. application. It is particularly desirable to improve the resistance of the coatings to the degrading effects of the laser beam during the ablation step.

SUMMARY OF THE INVENTION

In the novel method, as in the accelerated form of the prior method disclosed in the Heyman et al. patent, each of a dark-colored undercoating and a light-colored overcoating is applied one upon the other, each being dried in less than 60 seconds. Then, a plurality of related marks is recessed through the overcoating by ablation with a laser beam. Each of the undercoating and the overcoating is comprised of pigment particles and an alkali silicate binder. However, unlike the prior practice, the undercoating contains an operative proportion of mica particles as a filler. Surprisingly, the presence of mica in the undercoating improves and process survivability of both the undercoating and the overcoating, while retaining the improvements realized with the coatings disclosed in the above-cited Deal et al. application. Preferably, the coatings are made from aqueous suspensions of pigment particles containing dissolved sodium silicate, dissolved potassium silicate and lithium-stabilized silica sol. Advantages of the novel method include a reduction in the amount of organic additives with no mud cracking in the coating, less graying of the white coating during subsequent lehr baking, greatly increasing resistance of the undercoating to laser ablation, greatly reduced tendency to spalling of the glass substrate by the laser beam, and no particle generation. The readability of the marking does not degenerate during subsequent processing, as occurred with the coatings described in the Deal et al. application. The resistance of this mica-containing coating to laser ablation easily prevents the laser beam from penetrating through the coating and producing defects in the glass substrate.

DETAILED DESCRIPTION

Figure 1:
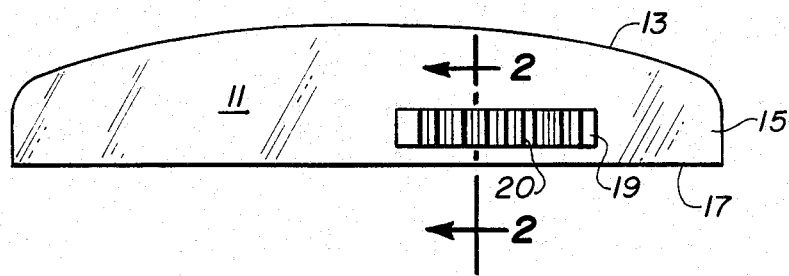
FIG. 1 is an elevational view of a glass faceplate panel for a CRT carrying a bar-code marking in the sidewall thereof prepared according to the novel method.
Figure 2:
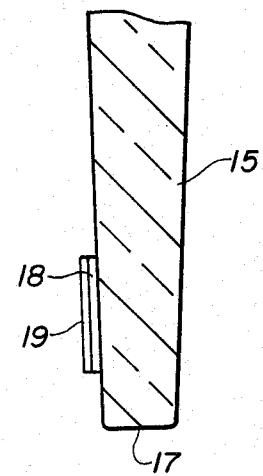
FIG. 2 is a sectional view along section lines 2—2 of a fragment of the panel shown in FIG. 1.

A typical glass faceplate panel 11 to be used as part of the envelope of a color television picture tube is shown in FIGS. 1 and 2. The panel 11 includes a rectangular viewing window 13 and an integral sidewall 15 around the window. The sidewall 15 has a panel seal land 17 at the distal end thereof. A thin integral panel undercoating 18 (FIG. 2) of a dark-colored light-absorbing material is located on the external side of the sidewall 15 in the area of interest. A thin integral panel overcoating 19 of a light-colored, light-reflecting material is located on the external side of the undercoating 18. A machine-readable coded marking 20 is ablated through the panel overcoating 19. The marking 20 comprises a related sequence of substantially-parellel bars or stripes of predetermined widths and spacings, which are popularly referred to as a bar-code marking. Any of the codes used for bar-code marking may be used on the panel 11. In this specific embodiment, the marking 20 uses the interleaved two-of-five code which employs bars of one-unit and three-unit widths and spaces therebetween of one-unit and three-unit widths. Since bar codes are described in detail elsewhere, no further description of the code itself is necessary.

Figure 4:
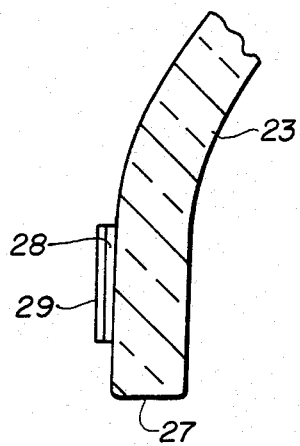
FIG. 4 is a sectional view along section lines 4—4 of a fragment of the funnel shown in FIG. 3.
Figure 3:
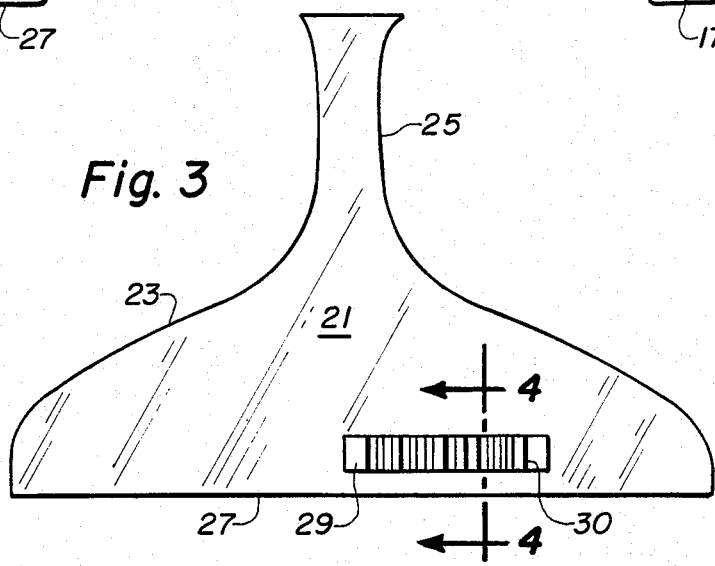
FIG. 3 is an elevational view of a glass funnel for a CRT carrying a bar-code marking in a surface thereof prepared according to the novel method.

A typical glass funnel to be used as part of the envelope of a color television picture tube is shown in FIGS. 3 and 4. The funnel includes a cone 23, a neck 25 integral with the narrow end of the cone 23 and a funnel seal land 27 at the wide end of the cone 23. A thin integral funnel undercoating 28 of a dark-colored, light-absorbing material is located on the external surface of the cone in the area of interest. A thin integral funnel overcoating 29 of light-colored, light-reflecting material is located on the external side of the funnel undercoating 28. A machine-readable coded marking 30 as described above for the panel 11 is ablated through the funnel overcoating 29. In both FIGS. 1 and 3, the coatings and the markings may be placed anywhere on the workpieces. However, for making and reading the markings automatically by machine, it is important that the markings be placed at locations that are easily located and accessed.

As shown in FIG. 1, the panel marking 20 and the marks thereof are about 19 mm (0.75 inch) high and about 76.2 mm (3.00 inches) wide. The closest edge of the panel marking 20 is about 19 mm (0.75 inch) away from the seal land 17, and the bars of the marking 20 extend in a direction about normal to the surface of the seal land 17. The recessed marks are either about 0.6 mm (0.025 inch) or about 1.9 mm (0.075 inch) wide. The panel marking 20 includes a central portion with specific identifying information, typically about 63.5 mm (2.50 inches), wide, and end portions about 6.3 mm (0.25 inch) wide at each end of the central portion for signalling a machine reader the "start" and the "stop" of the marking. The panel coatings 18 and 19 are slightly wider than the panel marking 20, providing a border about 0.6 mm (0.025 inch) wide at each end of the panel marking 20.

The funnel marking 30 on the funnel 21 shown in FIG. 3 is similar to the above-described panel marking 20 and is located about 19 mm (0.75 inch) from the funnel seal land 27. During subsequent processing, the panel and the funnel may be joined together at their respective seal lands by methods known in the art. The coatings 18, 19, 28 and 29 and the markings 20 and 30 are not degraded during the common frit-sealing method which employs temperatures of more than 400° C.

In addition to a light-reflecting ability, the following characteristics in the panel and the funnel overcoatings 19 and 29 are desirable:

(1) effective scatterer and depolarizer of light,
(2) resistant to temperatures of at least 450° C.,
(3) chemically resistant to chemicals used in the processing of kinescopes,
(4) mechanically resistant to the abrasions and impacts typical of kinescope handling during manufacturing,
(5) ability to be removed cleanly by an ablative process, and
(6) high optical contrast with respect to the associated undercoating.

In addition to light-absorbing ability, desirable characteristics for the panel and funnel undercoatings 18 and 28 are items (2), (3) and (4) above. In addition, the undercoatings should exhibit high optical contrast with respect to the associated overcoating, and be resistant to ablation by a laser beam.

Each of the undercoatings and overcoatings consists essentially of pigment particles and an alkali silicate binder. Some suitable light-colored, light-reflecting pigments for the overcoatings are titanium dioxide, barium sulfate, zirconium dioxide, and aluminum oxide. Some suitable dark-colored pigments for the undercoatings are graphite, black iron oxide, manganese dioxide, carbon black and refractory black pigments. The alkali silicate binders may be sodium silicate, potassium silicate, and/or lithium silicate. It is preferred that, for each marking, the alkali silicate binder consists essentially of a three-component combination of sodium silicate, potassium silicate and lithium silicate. Sodium silicate and potassium silicate are introduced from aqueous solutions thereof. Lithium silicate is introduced from an aqueous suspension of a lithium-stabilized silica sol. Suitable lithium-stabilized silica sols are described in U.S. Pat. No. 2,668,149 to R. K. Iler, U.S. Pat. No. 3,459,500 to M. A. Segura et al. and U.S. Pat. No. 3,565,675 to R. H. Sams. The weight ratio of $SiO_2/Li_2O$ in the lithium-stabilized silica sol is in the range of about 4.0 to 20.0. The weight ratio of $SiO_2/K_2O$ and $SiO_2/Na_2O$ in each of the potassium silicate and sodium silicate solutions is in the range of 1.6 to 3.8. The silicate binders are in aqueous suspensions containing about 10 to 65 weight percent of silicate solids. The weight ratio on a dry basis of lithium-stabilized silica sol to potassium silicate and sodium silicate may be in the range of 1.2–2.1 to 2.5–3.5. Put another way, the dry silicate solids (100%) may be 25 to 45 weight percent lithium-stabilized silica solids, 55 to 75 weight percent potassium silicate solids and/or sodium silicate solids. And, sodium silicate solids may be 32 to 43 percent and potassium silicate solids may be 23 to 32 weight percent of the dry silicate solids. The preferred ranges are, on a dry basis, 26 to 30 weight percent lithium-stabilized silica solids, 29 to 32 weight percent potassium silicate solids and 38 to 42 weight percent sodium silicate solids.

Lower weight ratios of silica ($SiO_2$) to alkali ($Li_2O + Na_2O + K_2O$) in the suspensions generally yield coatings that are more adherent to glass but have a lower optical contrast in the marking. Higher weight ratios of lithium-stabilized silica solids with respect to the other silicates in the suspensions generally yield coatings that are physically harder and dry faster after application. Higher weight ratios of sodium silicate with respect to the other silicates improve the adhesion of the coating to the glass or undercoating. Higher weight ratios of potassium silicate with respect to the other silicates produce harder coatings and generally reduced flaking. However, the presence of all three silicates is preferred, and a proper balance of proportions of the three silicates is desirable within the above-stated ranges. Optimum desired qualities are easily determined after relatively few laboratory trials.

The mica may be any of the species of mica that are available. A mica is a hydrous disilicate of aluminum and another base which forms a solid that separates readily into thin tough laminae. Muscovite and biotite are typical micas that can be used in the novel method. The mica is introduced into the undercoating suspension as a powder that passes through 250 mesh or finer. The mica is present in the undercoating suspension in the range of 6 to 28 weight percent, preferably about 14 to 16 percent, of the suspension; and 24 to 70 weight percent, preferably about 37 percent, of the dry solids in the suspension. Other minerals, such as talc and silica, have been tested in similar undercoating formulations and have not produced coatings as desirable as the mica-containing coatings.

A preferred formulation for producing a black undercoating according to the novel method is, in weight percent, as follows:

| | |
|---|---|
| Black refractory pigment (PC-17, O. Hummel Corp., Cleveland, OH) | 9.49% |
| Muscovite Mica (325 mesh, U.S. Mica Co., Inc.) | 14.66% |
| Lithium-stabilized silica sol (Polysilicate 48, E. I. du Pont & Company, Wilmington, DL) | 19.96% |
| Potassium silicate solution (Kasil 88, 28.95% solids, PQ Corp., Phila., PA) | 16.00% |
| Sodium silicate solution (C brand, PQ Corp., Phila., PA) | 11.96% |
| Deionized water | 27.64% |
| Dispersant (Polywet ND-2, Uniroyal Chemical Corp., Naugatuck, CN) | 0.29% |

This undercoating formulation is ball-milled until a fineness-of-grind of 5½ to 6½ Hegman (about 32 to 19μ mean particle size) is produced. Somewhat less than optimum characteristics result when the fineness-of-grind is greater than 6½ Hegman.

A preferred formulation for producing a white overcoating in weight percent is as follows:

| | |
|---|---|
| Barium sulfate | 17.0% |
| Titanium dioxide | 17.0% |
| Lithium-stabilized silica sol (Polysilicate 48) | 13.3% |
| Potassium silicate solution (Kasil 88) | 10.7% |
| Sodium silicate solution (C brand) | 8.0% |
| Deionized water | 33.2% |
| Dispersant (Polywet NO-2, Uniroyal Corp., Naugatuck, Conn., 25% solids) | 0.3% |
| Plasticizer (Neorez R-960, Polyvinyl Chemical Industires, Wilmington, MA) | 0.5% |

This overcoating formulation was milled in a ball mill for about 24 hours prior to spray coating.

The constituents of each coating formulation are mixed together and then ball milled for a period of time, for example, about 6 hours. Any type of mixing or milling may be used to provide a suitably smooth and uniform suspension. The undercoating and the overcoating may be applied to the glass workpiece in any one of several ways depending on the nature of the coating. Spraying has been used successfully. Rolling may be used if the surface of the glass workpiece is not overly rough. The coatings may be applied in the form of a prescreened decal or other printing transfer. The application method chosen should produce a layer that is as uniform in thickness as possible, since the clarity of the readout from the marking usually is better when the various coatings have substantially constant thickness. The coatings, which are typically about 0.13 mm (0.5 mil) thick, should be thick enough to have the required optical characteristics and not to thick as to tend to crack or flake.

The undercoating is first applied to a selected area of the workpiece and then dried in less than 60 seconds, and usually less than 10 seconds, with some small amount of warming at temperatures below 100° C. to accelerate the drying. The overcoating is then applied to the undercoating and dried in less than 60 seconds, and usually less than 10 seconds, with some small amount of heating of temperatures below 100° C. to accelerate the drying. After applying the overcoating to the undercoating, the marks are recessed through the overcoating as by abrasion or ablation to expose the contrasting undercoating. Some suitable methods for recessing the marks into the overcoating are described in the above-cited patent to P. M. Heyman et al. and in U.S. Pat. No. 4,323,755 issued Apr. 6, 1982 to M. J. Nierenberg.

When ablation is used, the laser beam may be moved to scribe the marks through the overcoating point-by-point. Alternatively, the laser beam may target a unit-width and full height of a mark. While the laser beam may have any infrared wavelengths, it is preferred that it have a wavelength of about 10.2μ such as is produced by a carbon-dioxide laser. It is not understood why the presence of mica is so effective in resisting the laser beam. The mica particles absorb incident light of the above-mentioned infrared wavelengths, converting it to heat, which, it is believed, is then conducted away rapidly enough to reduce vaporization of the undercoating to a trivial amount.

Then the coatings are heated or fired so as to fix the coatings to the workpiece to make them integral with the main body of the workpiece and to increase its durability. Alternatively, the coatings may be heated or fired to make them integral with the main body of the workpiece, and then the marks of the marking are recessed therein. However, recessing marks into a fired overcoating is more difficult than recessing marks into the overcoating before firing. Heating or firing has the effect of integrating the coatings into the main body. By this is meant that the coatings and the body become essentially inseparable parts of a single article, and the coatings cannot be removed from the body without destroying the overcoating. This is to be distinguished from a pigmented layer that is held to the body with an intermediate film of adhesive which can be softened and the layer overcoating released.

The combination of undercoating and overcoating as two integral layers produces a structure that has opposite optical characteristics (i.e., one layer is light-colored and light-scattering or light-reflecting, and the other layer is dark-colored and light-absorbing). The parameters of the recessing system are adjusted so that the recessing is completely through the overcoating and just penetrates into the undercoating, which is closer to the glass body. With a dark-colored, light-absorbing layer sandwiched between a light-colored, light-reflecting layer and the glass, the abraded marking has the preferred optical polarity. An advantage of this arrangement is that the dark-colored undercoating layer optically isolates the optical reader from any interfering reflections that may arise from behind the undercoating.

The panel 11 (FIG. 1) and the funnel 21 (FIG. 2) are typical workpieces comprising integral undercoating and overcoating. Also, included within the invention are other workpieces or combinations of workpieces and/or other material or combinations of materials. Thus, any glass workpiece may be marked by the novel method. In the completed novel workpiece, the marking is recessed into the coatings which are integral with the glass workpiece. Thereby, the marking exhibits substantially the same characteristics to the ambient as the workpiece itself. Being integral with the main body of the workpiece, there is no intermediate adhesive film present between the body and the coatings which limits the utility of the marking.

The markings may be read by detecting the differences in reflectivity between the marks of the marking and the surfaces therebetween in the specular angle. It is this difference which allows the marking to be read by a process including optically detecting the light reflection or the light scattering from the marked surfaces. Two devices which may be used to detect these markings are a laser scanner and a television camera. With a laser scanner, the light beam is scanned across the marked surface whereby the reflected light is modulated by the occurrence of recessed or nonrecessed areas. With a television camera, either ambient light or a fixed-light source provides the required illumination to activate the photosensitive surfaces in relation to the recessed or nonrecessed areas of the marking. The marking may be read with a commercially-available reader at intervals during and after the assembly of the workpiece into an assembled end product. A suitable reader is described in U.S. Pat. No. 3,801,182 to P. W. Jones in which a polarized light beam scans across the marking in a direction normal to the length of the bars of the marking. The reflected light is sensed and converted to a train of electrical signals that are representative of the marking. The signals are then decoded and used for some useful purpose, such as the control of a manufacturing process or the compilation of historical data.

What is claimed is:

1. In a method for producing a machine-readable coded marking in a surface of a glass workpiece, said method including
    (a) coating a selected surface area of said glass workpiece with an undercoating comprising a first aqueous suspension of first pigment particles and a first alkali silicate binder,
    (b) drying said undercoating,
    (c) coating said dry undercoating with an overcoating comprising a second aqueous suspension of second pigment particles and a second alkali silicate binder,
    (d) drying said overcoating, and
    (e) recessing a plurality of related marks through said overcoating by selectively ablating said overcoating with a laser beam,
    the improvement wherein said first suspension includes an operative proportion of mica particles, said proportion of mica being operative to reduce the tendency to spalling of said glass workpiece by said laser beam, and said second suspension is essentially free from mica particles.

2. The method defined in claim 1 wherein said mica particles are substantially entirely particles of muscovite.

3. The method defined in claim 1 wherein said mica particles constitute about 6 to 28 weight percent of said first aqueous suspension.

4. The method defined in claim 1 wherein said mica particles constitute about 16 weight percent of said aqueous solution.

5. The method defined in claim 1 wherein said first alkali silicate binder consists essentially of dissolved sodium silicate, dissolved potassium silicate and lithium-stabilized silica sol.

6. In a workpiece comprising a glass main body, a thin undercoating on a portion of said body and an overcoating on said undercoating, said overcoating having a plurality of related marks recessed through said overcoating, said undercoating comprising first pigment particles and a first alkali silicate binder and said overcoating comprising second pigment particles and a second alkali silicate binder,
    the improvement wherein said undercoating contains an operative proportion of mica particles therein and said overcoating is essentially free of mica, said proportion of mica being operative to reduce the tendency to spalling of the glass workpiece while said marks are being recessed through said overcoating.

7. The workpiece defined in claim 6 wherein said mica particles are substantially entirely particles of muscovite.

8. The workpiece defined in claim 6 wherein said mica particles constitute about 24 to 70 weight percent of said undercoating.

9. The workpiece defined in claim 6 wherein said mica particles constitute about 37 weight percent of said undercoating.

10. The workpiece defined in claim 6 wherein said first alkali silicate binder consists essentially of a mixture of sodium, potassium and lithium silicates.

* * * * *